United States Patent [19]

Ydoate et al.

[11] Patent Number: 5,222,586
[45] Date of Patent: Jun. 29, 1993

[54] METHODS AND APPARATUS FOR CONVEYING PACKAGES IN A MANNER MINIMIZING JAMS

[75] Inventors: Edward Ydoate, Flemington; Goro Okada, Glen Rock, both of N.J.

[73] Assignee: Sandvik Process Systems, Inc., Totowa, N.J.

[21] Appl. No.: 865,874

[22] Filed: Apr. 9, 1992

[51] Int. Cl.$^5$ ............................. B65G 47/12
[52] U.S. Cl. ................ 198/452; 198/443; 198/447
[58] Field of Search ............ 198/396, 443, 447, 448, 198/451, 452, 453, 454, 455

[56] References Cited

U.S. PATENT DOCUMENTS

| 511,494 | 12/1893 | Bassett | 209/620 X |
|---|---|---|---|
| 1,499,205 | 6/1924 | Ekström et al. | 209/535 |
| 1,649,304 | 11/1927 | Gray | 198/400 |
| 3,372,790 | 3/1968 | Pembroke et al. | 198/451 X |
| 3,628,648 | 12/1971 | McClusky | 198/443 X |
| 3,838,763 | 10/1974 | Rooke et al. | 198/399 X |
| 4,192,416 | 3/1980 | Thonissen | 198/448 X |
| 4,889,224 | 12/1989 | Denker | 198/454 X |

FOREIGN PATENT DOCUMENTS

| 0306121 | 12/1988 | Japan | 198/453 |
|---|---|---|---|
| 0306122 | 12/1988 | Japan | 198/452 |

Primary Examiner—Robert P. Olszewski
Assistant Examiner—James R. Bidwell
Attorney, Agent, or Firm—Burns, Doane, Swecker & Mathis

[57] ABSTRACT

A conveying junction includes upstream and downstream conveyors, and an intermediate conveyor which transfers packages from the upstream conveyor to the downstream conveyor. A drop-off zone is located adjacent an outer edge of the intermediate conveyor. The upstream conveyor has a greater width than each of the downstream and intermediate conveyors, and the width of the intermediate conveyor is less than one-half the width of the downstream conveyor. This tends to ensure that the downstream conveyor receives only packages arranged in single file and having a width less than the width of the downstream conveyor, in order to minimize the risk of jams occurring in downstream turns of the conveyor system. A driven roller can be disposed adjacent and below the outer edge of the intermediate conveyor to accelerate the discharge of the packages.

16 Claims, 2 Drawing Sheets

U.S. Patent   June 29, 1993   Sheet 1 of 2   5,222,586

METHODS AND APPARATUS FOR CONVEYING PACKAGES IN A MANNER MINIMIZING JAMS

BACKGROUND OF THE INVENTION

The present invention relates to material handling and, in particular, to methods and apparatuses for conveying packages and a mechanism for controlling the location of packages on a conveyor.

It is conventional to convey large numbers of packages at high speed, especially in the parcel delivery industry, wherein the packages are sorted according to desired categories. The efficiency with which the packages are handled can be seriously diminished when jam-ups of packages occur that require that conveyor lines be shut down until the jam has been cleared.

While a jam-free conveyance of packages along the straight flights of a conveyor is relatively easily accomplished, problems can occur at turns where wide packages present a serious risk of jamming. The sharper the turn, the greater the risk.

Measures to minimize this risk have been taken, such as the use of unscrambling conveyors which comprise driven rollers whose axes extend obliquely relative to the direction of conveyance. As a result, packages are caused to be displaced laterally toward one side of the conveyor and become aligned behind one another.

Notwithstanding the success of such unscrambling conveyors, it can still occur that a package exits the unscrambling conveyor possessing a width which exceeds a maximum width for jam prevention at downstream turns. Also, two packages may exit the unscrambling conveyor while traveling abreast and thereby presenting a combined width which is large enough to create problems at downstream turns.

It would be desirable, therefore, to provide a mechanism for alleviating that problem.

SUMMARY OF THE INVENTION

The present invention relates to a conveying apparatus for conveying packages and comprises upstream, downstream, and intermediate conveying surfaces. The upstream conveying surface conveys packages with inner edges of the packages traveling along a reference line. The upstream conveying surface has a first width measured from the reference line to an outer edge of the upstream surface. The downstream conveying surface has a second width measured from the reference line to an outer edge of the downstream conveying surface. The intermediate conveying surface is situated between the upstream and downstream conveying surfaces for transferring packages from the upstream conveying surface to the downstream conveying surface. The intermediate conveying surface has a third width measured from the reference line to an outer edge of the intermediate conveying surface. A drop-off zone is situated adjacent the outer edge of the intermediate conveying surface for receiving packages which fall therefrom. The first width is greater than each of the second and third widths, and the third width is less than one-half of the second width, so that the downstream conveying surface tends to receive only packages which are arranged in single file and which are of a width less than the second width.

Preferably, the upstream, downstream, and intermediate conveying surfaces are formed by upstream, downstream, and intermediate driven conveyors, respectively. Preferably, a discharge accelerator is disposed in the drop-off zone and is driven in a direction for accelerating the discharge of packages from the intermediate conveying surfaces. That discharge accelerator preferably comprises a driven roller located at a lower elevation than the intermediate conveying surface.

The present invention also involves a method of conveying packages, the method comprising providing upstream, intermediate, and downstream conveying surfaces which are arranged in alignment for sequentially conveying packages. Each of the conveying surfaces has a width measured from a reference line to an outer edge of the respective conveying surface. The width of the intermediate conveying surface is less than the width of the upstream conveying surface. The width of the downstream conveying surface is less than the width of the upstream conveying surface and greater than two times the width of the intermediate conveying surface. The packages are conveyed sequentially along the upstream, intermediate, and downstream conveying surfaces, with inner edges of the packages traveling along the reference line. Packages traveling abreast, and packages having a width greater than the downstream conveying surface, tend to fall from the outer edge of the intermediate conveying surface.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
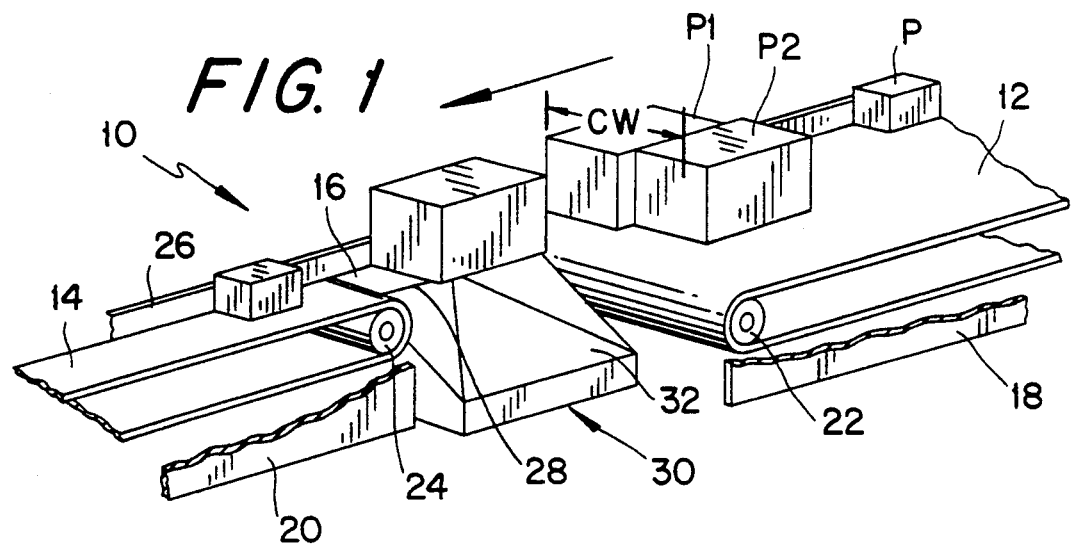
FIG. 1 is a perspective view of a conveyor junction according to the present invention as packages are being conveyed therealong.

A conveyor junction 10 for packages comprises an upstream conveyor 12, a downstream conveyor 14, and an intermediate conveyor 16, each having a conveying surface. The conveyors 12, 14, 16 could comprise stationary inclined chutes, but preferably comprise suitably driven conveyor mechanisms, such as a solid or mesh belt or a series of driven rollers. The upstream conveyor 12 is mounted to a frame including an upright wall 18, and the downstream conveyor 14 is mounted to a frame including an upright wall 20. The upstream conveyor 12 extends around a drive drum 22, and the downstream conveyor 14 extends around a drive drum 24, the drive drums being of any suitable motor-driven type.

Extending along one side of the conveyors 12, 14, 16 is an upright side wall 26. The upstream conveyor 12 receives packages P from a conveyor such as an unscrambling conveyor, an accumulator conveyor, or an aligner conveyor, for example, which is intended to align the packages in the direction of travel and position the packages in single file along the side wall 26. The side wall thus guides the packages and defines a reference line along which inner edges of the packages travel.

Occasionally, however, it occurs that instead of being positioned in single file, some of the packages may be conveyed abreast of one another, i.e., in side-by-side relationship. For example, the packages P1, P2 are traveling abreast. The combined width CW occupied by those two packages may present a problem at a downstream location in the conveyor system, especially around turns by creating a jam.

Figure 3:
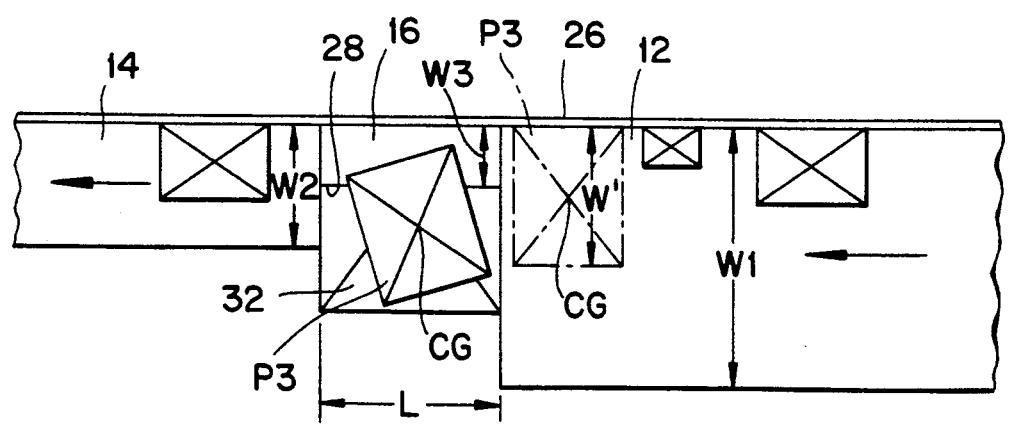
FIG. 3 is a plan view of the conveying apparatus depicted in FIG. 1 as an exceptionally wide package falls from the drop-off zone.

Also, a single package P3 depicted in FIG. 3 may be of such a large width W' that it might jam in the downstream turns.

The risk that the abreast packages P1, P2, or the excessively wide package P3 may jam downstream is prevented by the conveyor junction 10, wherein the width W1 of the upstream conveyor is larger than each of the widths W2 and W3 of the downstream and intermediate conveyors 14, 16, and wherein the width W3 of the intermediate conveyor is less than one-half of the width W2 of the downstream conveyor 14. Those widths are measured from the reference line defined by the guide wall 26 to an outer edge of the respective conveyors 12, 14, 16.

Figure 2:
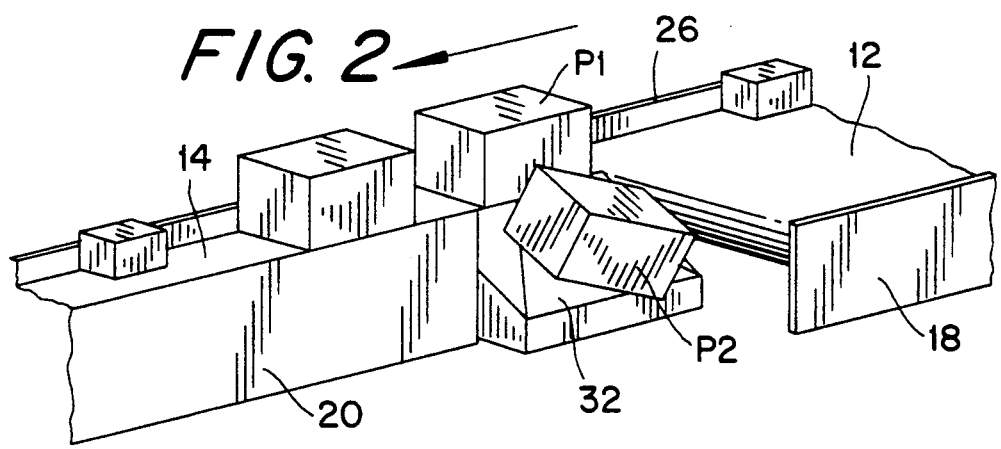
FIG. 2 is a view similar to FIG. 1 as a package falls from a drop-off zone of the conveying apparatus.

As a result, in the case of packages P1, P2 traveling abreast, the outer package P2 (i.e., the package farthest from the side wall 26) will have its center of gravity situated outside of the outer edge 28 of the intermediate conveyor 16 and will fall off that conveyor into a drop-off zone 30 as depicted in FIG. 2. A ramp 32 is situated in the drop-off zone to guide the package P2 when it falls off the intermediate conveyor 16. The discharged package P2 can then be manually replaced onto the conveyor system. Alternatively, the packages can fall onto another conveyor which can transport the packages to a suitable location.

The length L of the intermediate conveyor should be made larger than the length of the longest package anticipated to be conveyed.

The exceptionally wide package P3, depicted in FIG. 3, has a width W' greater than the width W2 of the downstream conveyor, whereby its center of gravity CG is situated outside of the edge 28 of the intermediate conveyor (assuming a substantially uniform distribution of the weight of the package contents as is generally the case). That package will, therefore, fall down the chute, as depicted in FIG. 3.

This tends to ensure that the packages reaching the downstream conveyor 14 will be in single file and will present a width which is less than the width W2 of the downstream conveyor. Consequently, the risk of jams occurring downstream of the intermediate conveyor, especially during turns, will be minimized.

It will be appreciated that on occasion more than one package may travel abreast of one another wherein one or some of those packages are so narrow that the combined width of the abreast packages is less than the width W3 of the intermediate conveyor. In such a case, the outer package will not fall off the outer edge 28 of the intermediate conveyor. However, that is of no consequence, because those packages will not present a risk of jamming, due to their relatively small combined width.

It may also occur that the exceptionally wide package P3 may have the weight of its contents distributed unevenly, such that the center of gravity of the package is disposed inwardly of the outer edge 28 of the intermediate conveyor. That package will not drop off the edge 28, but instead will be transferred to the downstream conveyor. Even though such occurrences will present a jamming risk, they will be relatively infrequent.

Therefore, it will be appreciated that the present invention significantly alleviates the risk of jamming by tending to ensure that the downstream conveyor 14 receives only packages arranged in single file and having a width less than that of the downstream conveyor.

Figure 4:
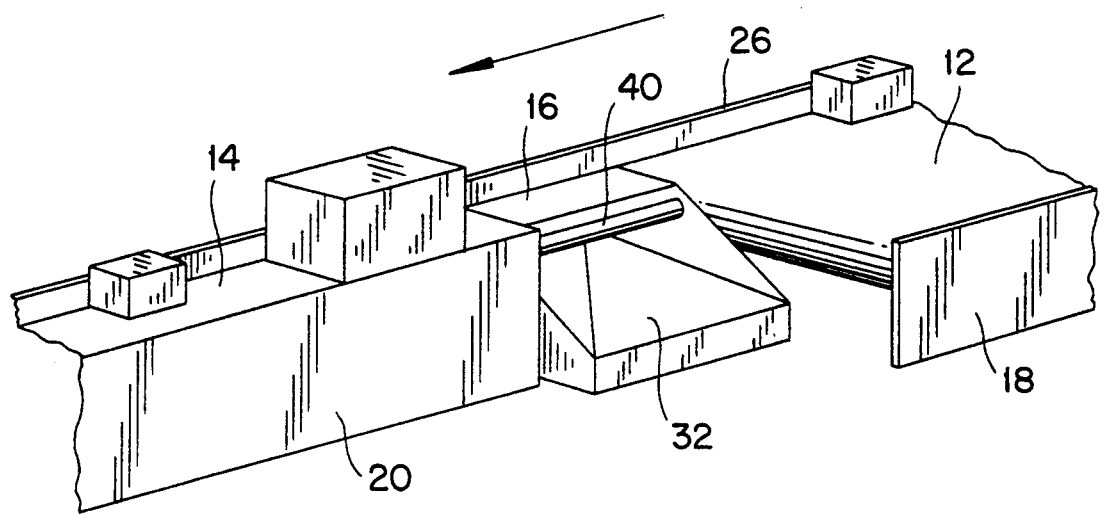
FIG. 4 is a view similar to FIG. 2 of a modified embodiment of the invention.
Figure 5:
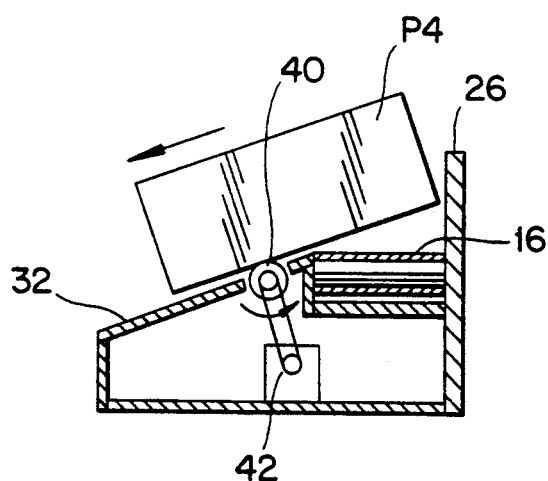
FIG. 5 is a cross-sectional view taken through FIG. 4.

In order to expedite the egress of packages from the intermediate conveyor 16, a discharge accelerator may be provided, as depicted in FIGS. 4 and 5. The discharge accelerator comprises a roller 40 which is driven in a direction tending to frictionally displace a falling package downwardly. The roller 40 is rotated about an axis extending parallel to the reference line defined by the wall 26 by means of a motor 42. In order to ensure that the packages do not engage the roller 40 unless they are actually falling from the intermediate conveyor, the roller 40 is disposed at a lower elevation than the conveying surface of the intermediate conveyor.

In lieu of a roller, the discharge accelerator could comprise other types of driven devices, such as a belt conveyor for example.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A conveying apparatus for conveying packages comprising:
   an upstream conveying surface for conveying packages with inner edges of the packages traveling along a reference line, said upstream conveying surface having a first width measured from said reference line to an outer edge of said upstream conveying surface,
   a downstream conveying surface having a second width measured from said reference line to an outer edge of said downstream conveying surface,
   an intermediate conveying surface situated between said upstream and downstream conveying surfaces for transferring packages from said upstream conveying surface to said downstream conveying surface, said intermediate conveying surface having a third width measured from said reference line to an outer edge of said intermediate conveying surface, and
   a drop-off zone situated adjacent said outer edge of said intermediate conveying surface for receiving packages which fall therefrom,
   said first width being greater than each of said second and third widths, and said third width being less than one-half of said second width, so that said downstream conveying surface tends to receive only packages which are arranged in single file and which are of a width less than said second width.

2. A conveying apparatus according to claim 1, wherein said upstream, downstream, and intermediate conveying surfaces are formed by upstream, downstream and intermediate driven conveyors, respectively.

3. Apparatus according to claim 2, wherein said upstream, downstream, and intermediate driven conveyors comprises belt conveyors.

4. Apparatus according to claim 1 including a ramp in said drop-off zone for guiding packages which fall from said intermediate conveyor, said ramp being of fixed inclination.

5. A conveying apparatus according to claim 1 including a discharge accelerator disposed in said drop-off zone and driven in a direction applying a downward force to packages falling off said intermediate conveyor for accelerating the discharge of packages away from said intermediate conveying surface.

6. A conveying apparatus according to claim 5, wherein said discharge accelerator is disposed at a lower elevation than said intermediate conveying surface.

7. A conveying apparatus according to claim 6, wherein said discharge accelerator comprises a driven roller.

8. A conveying apparatus according to claim 7, wherein said roller is driven about an axis extending substantially parallel to said reference line.

9. A conveying apparatus according to claim 3, wherein said intermediate belt conveyor comprises a single belt.

10. A conveying apparatus according to claim 4, wherein said ramp includes a discharge accelerator driven in a direction applying a downward force to packages falling off said intermediate conveyor.

11. A conveying apparatus according to claim 10, wherein said discharge accelerator is located above a lower edge of said ramp.

12. A conveying apparatus according to claim 10, wherein said discharge accelerator comprises a driver roller, a portion of an outer periphery o said roller projecting above a surface of said ramp.

13. A conveying apparatus according to claim 12, wherein said roller is driven about an axis extending substantially parallel to said reference line.

14. A method of conveying packages, comprising:
providing upstream, intermediate, and downstream conveying surfaces arranged in alignment for sequentially conveying packages, each of said conveying surfaces having a width measured from a reference line to an outer edge of the respective conveying surface, said width of said intermediate conveying surface being less than said width of said upstream conveying surface, and said width of said downstream conveying surface being less than said width of said upstream conveying surface and greater than two times said width of said intermediate conveying surface, and
conveying packages sequentially along said upstream, intermediate, and downstream conveying surfaces, with inner edges of the packages traveling along said reference line, such that packages traveling abreast, and packages having a width greater than said downstream conveying surface, tend to fall from said outer edge of said intermediate conveying surface.

15. A method according to claim 14 including driving said conveying surfaces to advance the packages.

16. A method according to claim 14 including causing packages falling from said intermediate conveying surface to engage a driven accelerator member which accelerates the discharge of the packages away from said intermediate conveying surface.

* * * * *